United States Patent
Motoki

(10) Patent No.: US 7,821,539 B2
(45) Date of Patent: Oct. 26, 2010

(54) METHOD AND APPARATUS FOR INSPECTING SOLID-STATE IMAGE PICKUP DEVICE

(75) Inventor: Yoshiaki Motoki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1182 days.

(21) Appl. No.: 11/444,446

(22) Filed: Jun. 1, 2006

(65) Prior Publication Data

US 2006/0279637 A1 Dec. 14, 2006

(30) Foreign Application Priority Data

Jun. 9, 2005 (JP) .................... P. 2005-169602

(51) Int. Cl.
*H04N 5/225* (2006.01)
*H04N 17/02* (2006.01)
*H04N 5/217* (2006.01)
*H04N 9/64* (2006.01)
*H01L 27/00* (2006.01)

(52) U.S. Cl. ............ 348/207.99; 348/187; 348/241; 348/248; 250/208.1

(58) Field of Classification Search ........... 348/180, 348/86, 175, 187, 188, 189, 190, 222.1, 248–251, 348/256, 207.99, 241; 250/208.1
See application file for complete search history.

(56) References Cited

U.S. PATENT DOCUMENTS 5,157,501 A * 10/1992 No et al. ............ 348/294
5,699,440 A * 12/1997 Carmeli ............ 382/100

FOREIGN PATENT DOCUMENTS

JP 2004-40508 A 2/2004
JP 2004040508 A * 2/2004

* cited by examiner

*Primary Examiner*—Tuan Ho
*Assistant Examiner*—Marly Camargo
(74) *Attorney, Agent, or Firm*—Birch, Stewart, Kolasch & Birch, LLP

(57) ABSTRACT

Apparatus for inspecting a solid-state image pickup device comprises: a memory for saving an image data from the solid-state image pickup device; an arithmetic operation part that performs predetermined image processing on the image data saved in the memory and outputting an evaluation value; and a controller that judges whether the solid-state image pickup device is good based on the evaluation value. The arithmetic operation part adds image data values saved in the memory in the column direction (extension direction of a vertical charge transfer path) to obtain a column-based addition value. The arithmetic operation part then obtains difference data from the adjacent value, counts the number of difference data items contained in the plurality of specified level regions, and obtains the evaluation value based on the sum total of the products of level information and count in the level regions.

5 Claims, 4 Drawing Sheets

METHOD AND APPARATUS FOR INSPECTING SOLID-STATE IMAGE PICKUP DEVICE

BACKGROUND OF THE INVENTION

1. Field of the Invention

The present invention relates to a method and apparatus for inspecting a solid-state image pickup device that detect a defect from an image signal coming from the solid-state image pickup device.

2. Description of the Invention

A solid-state image pickup device, for example an interline transfer type CCD (Charge Coupled Device) 11 has a plurality of photoreceptors 2 (photoelectric converter) for performing photoelectric conversion such as PN-junction photodiodes arranged two-dimensionally in horizontal and vertical directions. Vertical charge transfer paths 4 are respectively arranged for the plurality of photoreceptors 2 arranged in column direction (vertical direction). Between each photoreceptor and vertical charge transfer path 4 is placed a transfer gate 3. At one end of each vertical charge transfer path is arranged a horizontal charge transfer path 5. At the tip of the horizontal charge transfer path 5 in the data transfer direction is provided an output amplifier 6.

The photoreceptor 2 performs photoelectric conversion of irradiated light and accumulates signal charges having a charge amount corresponding to the light amount. When the transfer gate 3 is opened, the accumulated signal charges are simultaneously read onto the vertical charge transfer path 4 from each photoreceptor 2. The vertical charge transfer path 4 shifts the read signal charges and vertically transfers them by way of a vertical transfer clock to transport them to the horizontal charge transfer path 5. The horizontal charge transfer path 5 shifts the signal charges transported from the vertical charge transfer path 4 in the output amplifier 6 byway of the horizontal transfer clock. The output amplifier amplifies the signal charges and outputs them as a voltage signal.

When intense light is irradiated onto some of the charge transfer paths 2 and the resulting signal charges fills up the capacity of the photoreceptor 2, excessive charges flow into peripheral photoreceptors 2, which causes signal charges to be output from the photoreceptors 2 that do not receive light. As a result, the periphery the light does not reach appears also bright, a so-called blooming phenomenon. As shown in FIG. 5, blooming causes high-level vertical lines 8A or low-level vertical stripes 8B to appear in an image 7 thus dramatically degrading the picture quality.

As related art inspection method and inspection apparatus capable of detecting such spot blooming, a method and apparatus are known for performing vertical median processing, vertical addition and differential processing on image data and comparing the resulting value with a standard value to judge whether the data is good (for example, see JP-A-2004-40508).

The inspection method and inspection apparatus described in JP-A-2004-40508 perform evaluation of an image while focusing on a single blooming area at a particularly high level. When a high-level vertical line is there, it is difficult to determine the other vertical stripe defects. Even when numerous spot blooming areas are found, only some of them can be detected. Thus, in case a large number of spot blooming areas are there each of which is at an acceptable low level, the entire image is sometimes judged good although the picture quality could be adversely influenced. This prevents high-accuracy evaluation of an entire image.

SUMMARY OF THE INVENTION

The invention has been accomplished in view of the aforementioned circumstances. An object of the invention is to provide a method and apparatus for inspecting a solid-state image pickup device capable of comprehensively evaluating an image in terms of high-level blooming and low-level blooming.

The above object of the invention is attained by the following methods and configuration.

(1) A method for inspecting a solid-state image pickup device comprising: a plurality of photoelectric converters that performs photoelectric conversion on incident light to generate signal charges; a plurality of vertical charge transfer paths that vertically transfers the signal charges generated by the photoelectric converters; and a horizontal charge transfer path that horizontally transfers the signal charges respectively transferred from said plurality of charge transfer paths, wherein said plurality of photoelectric converters are arranged two-dimensionally in horizontal and vertical directions so as to comprise a plurality of sets, each comprising the photoelectric converters arranged along an extension direction of the vertical charge transfer paths, the method comprising: adding a set of data values, each of which corresponds to each of the set of photoelectric converters, in a column direction corresponding to the extension direction of the vertical charge transfer paths, for each set of said plurality of sets of the photoelectric converters, based on the signal charges transferred from the vertical charge transfer path and the horizontal charge transfer path, so as to obtain a set of one-dimensional addition data in each of which the set of the data values are added in the column direction; obtaining a set of difference data, each of which is based on: each of the set of one-dimensional addition data; and difference information with respect to its adjacent one among the set of the one-dimensional addition data; setting a plurality of staged level regions each having a level information, and voting for anyone of the level regions where each of the set of difference data is contained, and counting the number of votes for each of the level regions; and judging whether the solid-state image pickup device is good by an evaluation value based on: the level information on each of the level regions; and the number of votes for each of the level regions.

According to this method for inspecting a solid-state image pickup device, the obtained image data values are added in the column direction (extension direction of the vertical charge transfer path), the difference data from the adjacent value is obtained, the number of difference data items contained in the plurality of specified level regions is counted, and whether the solid-state image pickup device is good is judged based on the level information on each of the level regions and the number of votes for each level region. This comprehensively evaluates an image in terms of high-level blooming and low-level blooming.

(2) The method for inspecting a solid-state image pickup device according to (1), wherein the evaluation value is the sum total of the products each of which is obtained by multiplying a level value, as the level information, for each of the level regions with the number of votes for each of the level region.

With the method for inspecting a solid-state image pickup device, it is possible to obtain the product of the level value for each level region and the count value, obtain the sum total of the products, and evaluate the sum total value as an evaluation value. This obtains an evaluation value with each level region weighted. Thus, high-level vertical lines as well as low-level spot blooming can be included in the target of evaluation, thereby evaluating an entire image from a solid-state image pickup device.

(3) The method for inspecting a solid-state image pickup device according to (1) or (2), further comprising: setting an output signal from the solid-state image pickup device to a predetermined constant level; and standardizing each of the set of difference data in accordance with a type of the solid-state image pickup device, wherein the voting for the level regions is performed based on the set of the standardized difference data.

The method for inspecting a solid-state image pickup device sets an output signal from the solid-state image pickup device to a predetermined constant level, standardizes the difference data in accordance with the type of the solid-state image pickup device, and counts the number of difference data items contained in each level region based on the standardized difference data to make evaluation. This provides universal and accurate evaluation independent of the type of the solid-state image pickup device.

(4) The method for inspecting a solid-state image pickup device according to (3), wherein the standardizing the set of difference data is processing that divides each of the set of difference data by the number of the photoelectric converters in the corresponding set of photoelectric converters arranged along an extension direction of the vertical charge transfer paths.

With the method for inspecting a solid-state image pickup device, the difference data items are divided by the number of pixels arranged in a direction along the vertical charge transfer path of the solid-state image pickup device for standardization. This allows evaluation that is based on the same evaluation criteria independent of the type of the solid-state image pickup device among those having difference number of pixels. It is thus possible to inspect a solid-state image pickup device with the same inspection method even when the type of the target solid-state image pickup device is changed. Further, it is possible to readily compare the performance of a solid-state image pickup device with that of a solid-state image pickup device of another type.

(5) An apparatus for inspecting a solid-state image pickup device comprising: a plurality of photoelectric converters that performs photoelectric conversion on incident light to generate signal charges, wherein said plurality of photoelectric converters are arranged two-dimensionally in horizontal and vertical directions; a plurality of vertical charge transfer paths that vertically transfers the signal charges generated by the photoelectric converters; and a horizontal charge transfer path that horizontally transfers the signal charges respectively transferred from said plurality of charge transfer paths, the apparatus comprising: a memory that saves image data formed based on the signal charges transferred by the vertical charge transfer path and the horizontal charge transfer path; an arithmetic operation part that performs a predetermined image processing on the image data stored in the memory and outputting an evaluation value; and a controller that judges whether the solid-state image pickup device is good by using the inspection method according to any one of (1) to (4).

Thus configured inspection apparatus for a solid-state image pickup device includes an arithmetic operation part for performing predetermined processing on the image data stored in a memory to output an evaluation value and a controller for judging whether the solid-state image pickup device is good by using the inspection method according to anyone of (1) to (4). This provides universal and accurate evaluation in terms of high-level blooming and low-level blooming.

DETAILED DESCRIPTION OF THE INVENTION

An embodiment of apparatus for inspecting a solid-state image pickup device according to the invention will be described referring to drawings.

Figure 1:
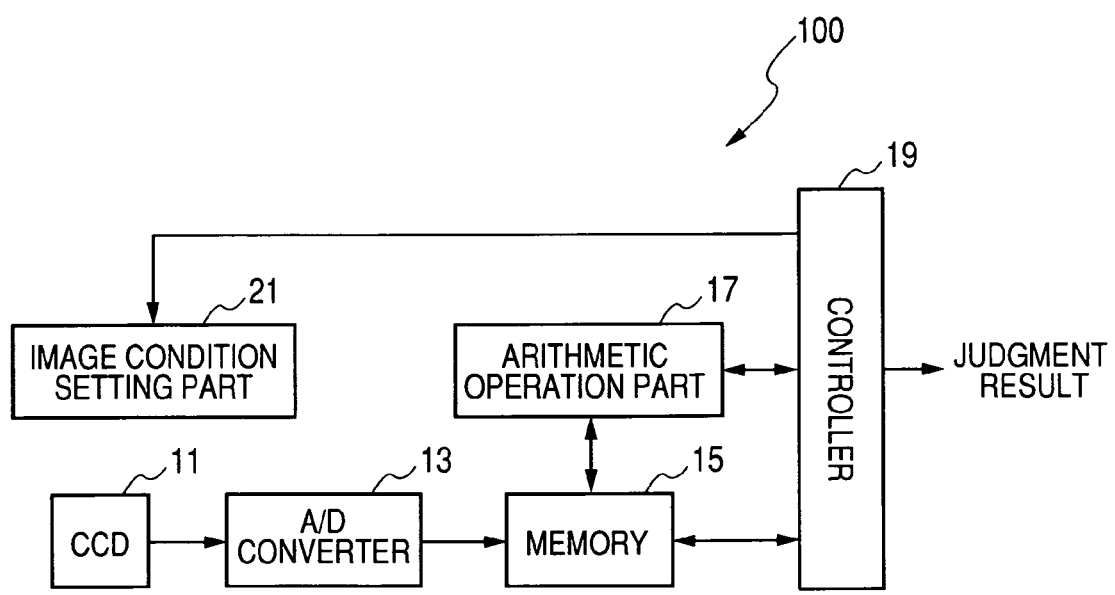
FIG. 1 is a general block diagram of apparatus for inspecting a solid-state image pickup device.
Figure 2:
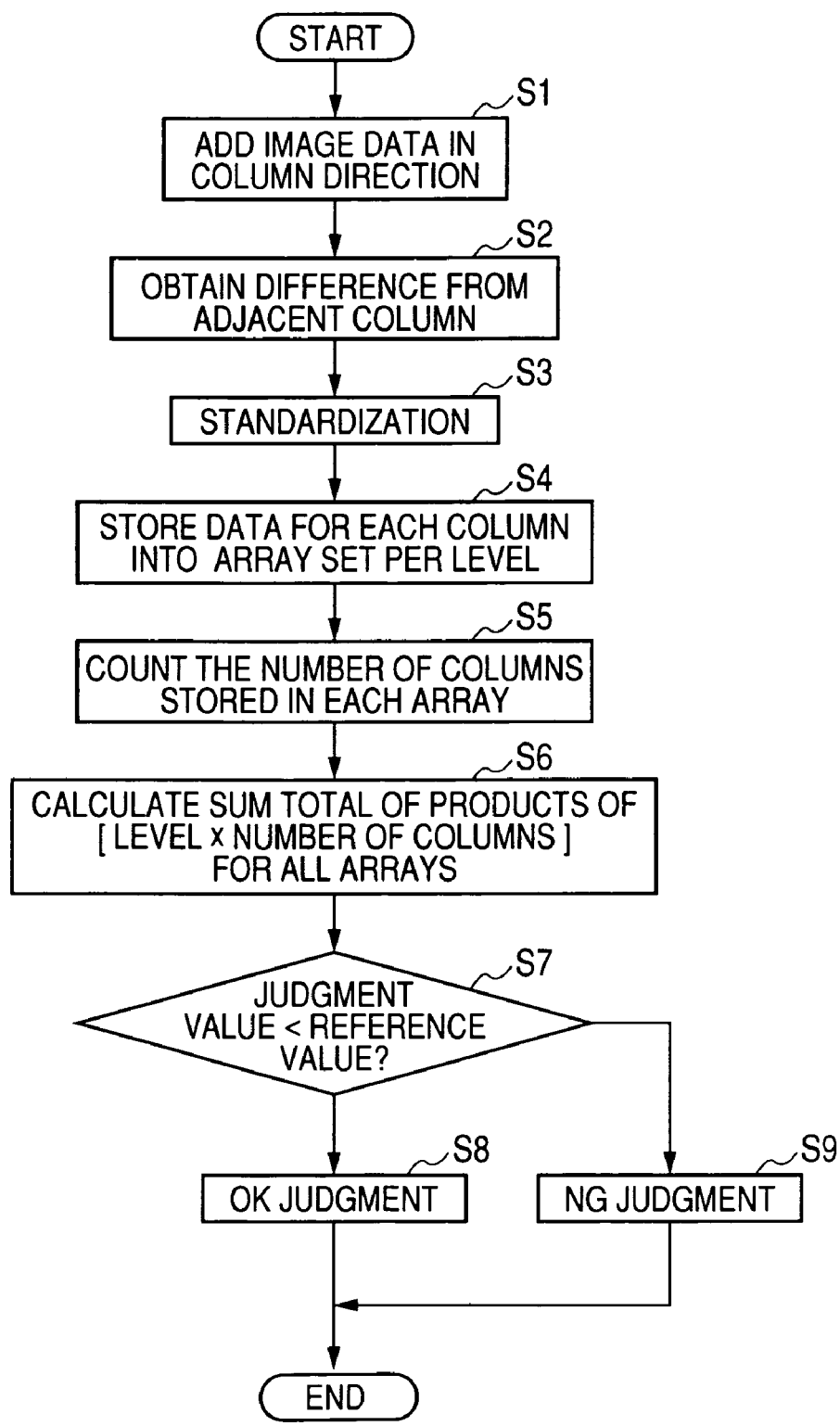
FIG. 2 is a flowchart showing the procedure for inspecting a solid-state image pickup device.
Figure 3A:
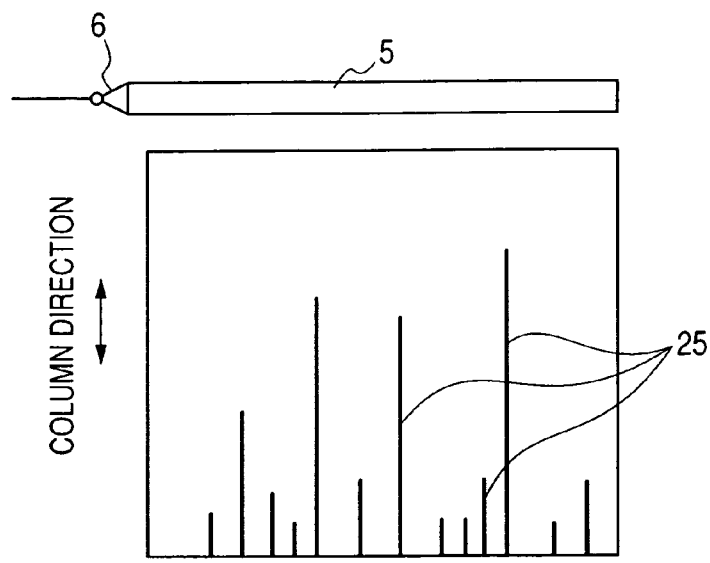
FIGS. 3A to 3D are conceptual drawings corresponding to the inspection procedure in FIG. 2.
Figure 3B:
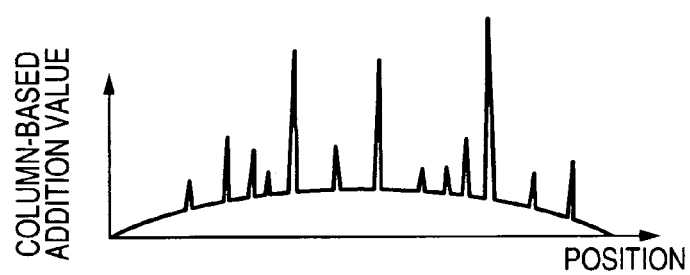
Figure 3C:
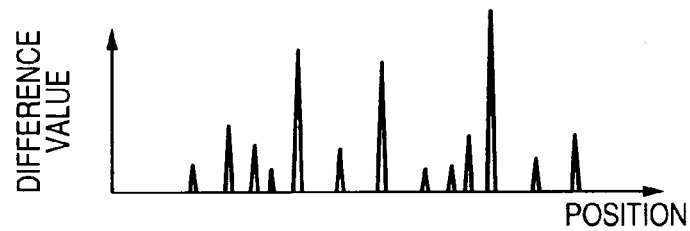

FIG. 1 is a general block diagram of apparatus for inspecting a solid-state image pickup device. FIG. 2 is a flowchart showing the procedure for inspecting a solid-state image pickup device. FIGS. 3A to 3D are conceptual drawings corresponding to the inspection procedure in FIG. 2. FIG. 4 is a general block diagram of the solid-state image pickup device.

Configuration of apparatus for inspecting a solid-state image pickup device will be described first. As shown in FIG. 1, apparatus for inspecting a solid-state image pickup device 100 comprises: an A/D converter 13 for converting an analog image data signal output from a solid-state image pickup device 11 to digital image data; a memory 15 for saving the image data; an arithmetic operation part 17 for performing predetermined image processing on the image data saved in the memory 15 and outputting an evaluation value A; a controller 19 for judging whether the solid-state image pickup device 11 is good based on the evaluation value A; and an imaging condition setting part 21 for setting the imaging conditions for the solid-state image pickup device 11. The solid-state image pickup device 11 is the same as the solid-state image-pickup device 11 described referring to FIG. 4.

The imaging conditions for the solid-state image pickup device 11 is set to predetermined constant conditions by the imaging condition setting part 21. When reference light is irradiated on the solid-state image pickup device 11, an analog signal corresponding to the intensity of light is output from the solid-state image pickup device 11. By setting the imaging conditions to a constant level, it is possible to readily compare the performance of a solid-state image pickup device between various types of solid-state image pickup devices 11 having different specifications and sensitivity from the obtained picked-up image data.

An analog signal output from the solid-state image pickup device 11 is converted to a digital signal by the A/D converter 13 and stored in the memory 15 as picked-up image data. The arithmetic operation part 17 performs image processing based on the picked-up image data stored in the memory 15 and output an evaluation value A for the solid-state image pickup device 11. The controller 19 compares the evaluation value A with a preset reference value to judge whether the solid-state image pickup device 11 is good and outputs the judgment result to a display unit (not shown).

Next, image processing by the arithmetic operation part 17 will be described with reference to FIGS. 2 and 3A to 3D. As shown in FIG. 2, the arithmetic operation part 17 reads picked-up image data from the memory 15 and adds the picked-up image data along the column direction as the extension direction of the vertical charge transfer path 4 to obtain one-dimensional addition data (S1). Namely, as shown in FIG. 3A, the arithmetic operation part 17 performs addition in the column direction (column-based addition) to the picked-up image data including the blooming 25 read out from the memory 15 to obtain the column-based addition value shown in FIG. 3B. The center of the column-based addition values shows a high arc because the picked-up image of the solid-state image pickup device 11 tends to be brighter in the center (shading effect).

In order to correct the shading, difference data that is based on the information on the difference from the value in the adjacent column is obtained (S2). As shown in FIG. 3C, the influence of the shading effect is canceled and blooming alone is captured. The difference data is divided by the number of pixels arranged in the direction along the vertical charge transfer path 4 (S3) to perform standardization. Dividing the difference data of each column by the number of pixels in the column direction of the solid-state image pickup device 11 for standardization means that the difference data is turned into a difference data value per pixel. Thus, for example, solid-state image pickup devices having different number of pixels may be evaluated using the same evaluation value A. This makes it easy to compare between solid-state image pickup devices of different specifications.

Next, a plurality of level regions (shown by levels a, b, c, d, e in FIG. 3D) are set to difference data values in stages. Voting is made for a level region containing difference data for each column (S4) and the number of votes is counted for each column (S5). A product of level information set to each level region and the count is obtained for each of the level regions, and the sum total of the products is calculated (S6).

That is, in case m level stages are set, the number of difference data items contained in each level regions ni (i=1–m) is counted.

Then, the product of level information Di and the count ni is obtained for each level region and the sum total of the products is obtained and an evaluation value A is calculated from the following equation:

$$A = n_1 \cdot D_1 + n_2 \cdot D_2 + n_3 \cdot D_3 + n_4 \cdot D_4 + n_5 \cdot D_5 + \ldots + n_m \cdot D_m$$

Figure 3D:
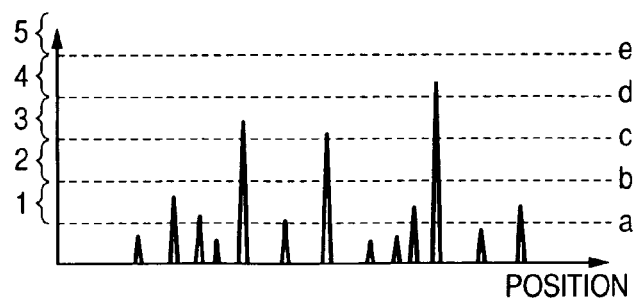
Figure 4:
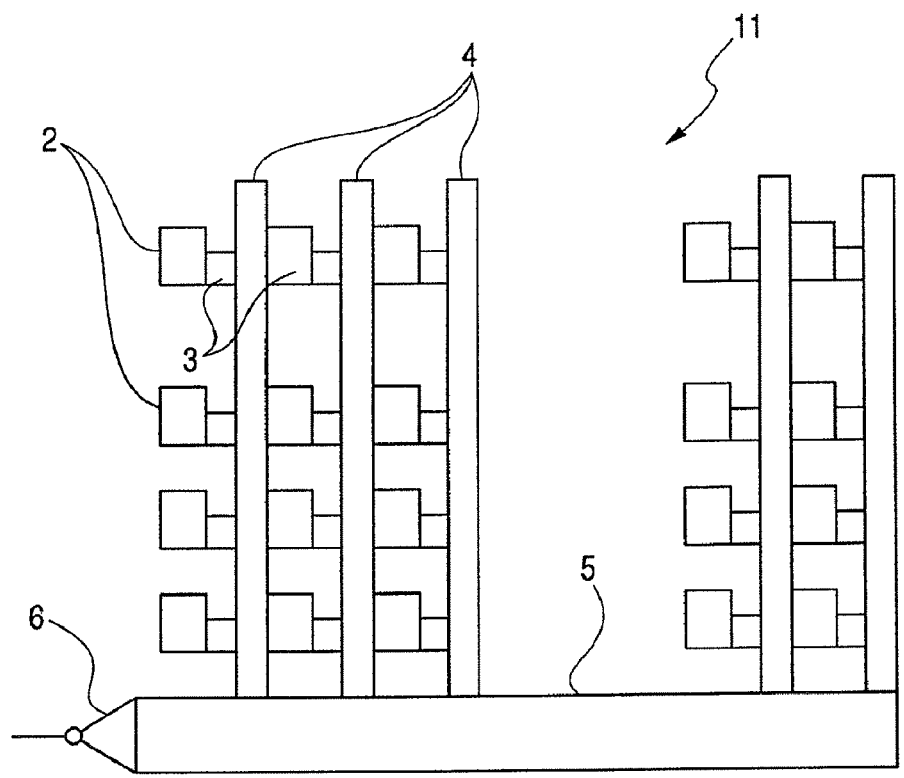
FIG. 4 is a general block diagram of the solid-state image pickup device.
Figure 5:
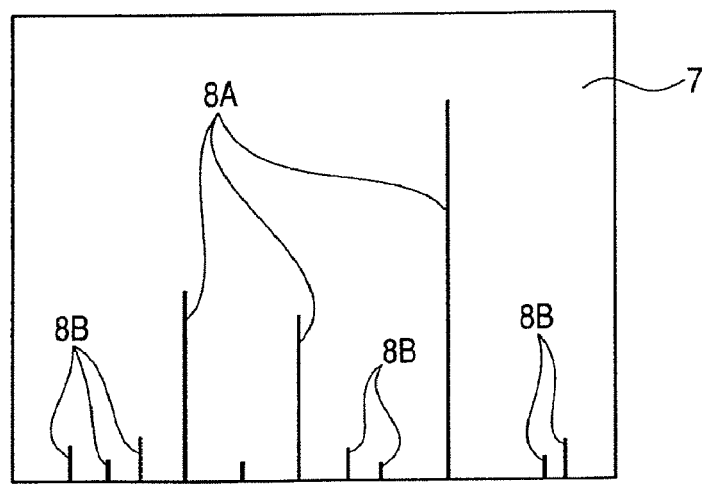
FIG. 5 is a conceptual drawing of an image containing blooming.

To be more specific, as shown in FIG. 3D, in case five level stages a, b, c, d, e are set, the number of difference data items contained in each of the respective level regions a-b, b-c, c-d, d-e, and above e is counted.

As shown in Table 1, the count of difference data contained in the level region a-b is 5, the count of difference data contained in the level region b-c is 0, the count of difference data contained in the level region c-d is 2, the count of difference data contained in the level region d-e is 1, and the count of difference data contained above the level e is 0. A product of level information and a count is obtained for each level region and the sum total of the products is calculated to obtain an evaluation value A=5a+2c+d.

The count of difference data below the level a (count 5 in the example shown in FIG. 3D) is omitted because blooming below the level a has only a negligible effect on the picture quality even when such blooming occurs in numerous areas. The level value and number of level stages to be set are arbitrary so that setting is made to best represent the evaluation of the solid-state image pickup device 11. While the lowest level value in the range of each level region is used as level information used to obtain an evaluation value A, the invention is not limited thereto but an arbitrary numerical value representing the weighting of each level region may be used.

TABLE 1

| Array | Level range mV | Count value | Level information × count value |
|---|---|---|---|
| 1 | a-b | 5 | 5a |
| 2 | b-c | 0 | 0 |
| 3 | c-d | 2 | 2c |
| 4 | d-e | 1 | d |
| 5 | above e | 0 | 0 |
| | Evaluation value A | | 5a + 2c + d |

The evaluation value A thus obtained is compared with a preset value by the controller 19 (S7). In case the evaluation value A is smaller than the reference value, the image is judged good (S8). In case the evaluation value A is larger than the reference value, the image is judged defective (S9). Then the judgment result is output.

As described above, according to the method and apparatus 100 for inspecting a solid-state image pickup device 11 in this embodiment, blooming level is classified and the number of blooming areas contained in each level region is counted. Then evaluation of an image is performed based on the sum total of the products of level information and count in respective level regions. This obtains an evaluation value A including all levels of blooming from high-level vertical lines to low-level spot blooming. This allows accurate comprehensive evaluation of the solid-state image pickup device 11.

The method and apparatus for inspecting a solid-state image pickup device according to the invention is not limited to the aforementioned embodiments but maybe subjected to modifications or improvements as required. For example, the method and apparatus are applicable to all inspection techniques for a solid-state image pickup device in general other than the inspection of vertical lines and vertical stripes.

According to the inventive method and apparatus for inspecting a solid-state image pickup device, blooming levels are classified and the number of blooming areas included in each level region is counted. Evaluation is then made based on the sum total of products of level information and number of counts for respective level regions. This provides universal and accurate evaluation in terms of high-level blooming and low-level blooming.

The entire disclosure of each and every foreign patent application from which the benefit of foreign priority has been claimed in the present application is incorporated herein by reference, as if fully set forth.

What is claimed is:

1. A method for inspecting a solid-state image pickup device comprising: a plurality of photoelectric converters that performs photoelectric conversion on incident light to generate signal charges; a plurality of vertical charge transfer paths that vertically transfers the signal charges generated by the photoelectric converters; and a horizontal charge transfer path that horizontally transfers the signal charges respectively transferred from said plurality of charge transfer paths, wherein said plurality of photoelectric converters are arranged two-dimensionally in horizontal and vertical directions so as to comprise a plurality of sets, each comprising the photoelectric converters arranged along an extension direction of the vertical charge transfer paths, the method comprising:

adding a set of data values, each of which corresponds to each of the set of photoelectric converters, in a column direction corresponding to the extension direction of the vertical charge transfer paths, for each set of said plurality of sets of the photoelectric converters, based on the signal charges transferred from the vertical charge transfer path and the horizontal charge transfer path, so as to obtain a set of one-dimensional addition data in each of which the set of the data values are added in the column direction;

obtaining a set of difference data, each of which is based on: each of the set of one-dimensional addition data; and difference information with respect to its adjacent one among the set of the one-dimensional addition data;

setting a plurality of staged level regions each having a level information, and voting for any one of the level regions where each of the set of difference data is contained, and counting the number of votes for each of the level regions; and judging whether the solid-state image pickup device is good by an evaluation value based on: the level information on each of the level regions; and the number of votes for each of the level regions.

2. The method for inspecting a solid-state image pickup device according to claim 1,
wherein the evaluation value is the sum total of the products each of which is obtained by multiplying a level value, as the level information, for each of the level regions with the number of votes for each of the level region.

3. The method for inspecting a solid-state-image-pickup device according to claim 1, further comprising:
setting an output signal from the solid-state image pickup device to a predetermined constant level; and
standardizing each of the set of difference data in accordance with a type of the solid-state image pickup device,
wherein the voting for the level regions is performed based on the set of the standardized difference data.

4. The method for inspecting a solid-state image pickup device according to claim 3,
wherein the standardizing the set of difference data is processing that divides each of the set of difference data by the number of the photoelectric converters in the corresponding set of photoelectric converters arranged along an extension direction of the vertical charge transfer paths.

5. An apparatus for inspecting a solid-state image pickup device comprising: a plurality of photoelectric converters that performs photoelectric conversion on incident light to generate signal charges, wherein said plurality of photoelectric converters are arranged two-dimensionally in horizontal and vertical directions; a plurality of vertical charge transfer paths that vertically transfers the signal charges generated by the photoelectric converters; and a horizontal charge transfer path that horizontally transfers the signal charges respectively transferred from said plurality of charge transfer paths,
the apparatus comprising:
a memory that saves image data formed based on the signal charges transferred by the vertical charge transfer path and the horizontal charge transfer path;
an arithmetic operation part that performs a predetermined image processing on the image data stored in the memory and outputting an evaluation value; and
a controller that judges whether the solid-state image pickup device is good by using the inspection method according to claim 1.

* * * * *